United States Patent [19]

Newell

[11] Patent Number: 4,502,648

[45] Date of Patent: Mar. 5, 1985

[54] ANSI-COMPATIBLE TAPE CARTRIDGE WITH OVERSIZE TAPE WIDTH

[75] Inventor: Chester W. Newell, San Jose, Calif.

[73] Assignee: Newell Research Corporation, Saratoga, Calif.

[21] Appl. No.: 505,315

[22] Filed: Jun. 17, 1983

[51] Int. Cl.³ .................... G03B 1/04; G11B 15/32
[52] U.S. Cl. ................................ 242/192; 242/199
[58] Field of Search .............. 242/192, 197–200; 360/93, 132

[56] References Cited

U.S. PATENT DOCUMENTS

| | | | |
|---|---|---|---|
| 3,861,619 | 1/1975 | Wolff | 242/188 |
| 4,324,372 | 4/1982 | Majicek et al. | 242/192 |
| 4,352,473 | 10/1982 | Satoh et al. | 242/199 |

Primary Examiner—Leonard D. Christian
Attorney, Agent, or Firm—Thomas Schneck

[57] ABSTRACT

A tape cartridge for one-half inch magnetic tape having a cartridge configuration which is mechanically interchangeable with an ANSI one-quarter inch cartridge. The newly provided cartridge preserves head placement, access door, end and beginning of tape sensing, tape direction, and an outwardly facing drive pulley, all associated with ANSI one-quarter inch cartridges. The present tape cartridge provides turn idlers in the corners of the cartridge so that a tape path can be established following the inner peripheral walls and regions of the cartridge, but avoiding passing in front of or underneath the drive pulley where interference would occur.

4 Claims, 1 Drawing Figure

ANSI-COMPATIBLE TAPE CARTRIDGE WITH OVERSIZE TAPE WIDTH

DESCRIPTION

1. Technical Field

The invention relates to magnetic tape cartridges and in particular to ANSI-compatible cartridges.

2. Background Art

Over the past five to ten years, one-quarter inch ANSI (American National Standards Institute) compatible tape cartridges have become widely accepted. Such cartridges have the configuration shown in U.S. Pat. No. 3,861,619 to Wolff. The ANSI standard for this cartridge prescribes the outline of the cartridge case; the location and size of a door giving head access to the tape, the manner and position of optical end of tape and beginning of tape sensing; and the location of a drive pulley by which power is transferred from a capstan in a magnetic tape drive in which the cartridge is placed. The ANSI standard does not prescribe the specific tape path within the cartridge, except that the tape must obviously come into contact with a magnetic head associated with the drive. The head is centered in the aperture which is revealed upon opening the previously mentioned door in the cartridge housing.

With the widespread acceptance of quarter-inch cartridges, there has been a proliferation of drives for such cartridges. On the other hand, manufacturers and users of half-inch magnetic tape have not been able to agree on one-half inch tape cartridge standards. There are several popular competing configurations at the present time.

It has occurred to others that it would be desirable to be able to use existing quarter-inch drives for half-inch tape. The problem however is that an ANSI compatible tape cartridge has a height of 0.655 inches. In existing quarter-inch tape cartridges, the tape passes beneath a drive pulley in spooling from one tape hub to another. There is not sufficient room for half-inch tape to pass beneath the drive pulley.

An object of the invention is to devise a cartridge configuration which meets ANSI standards for quarter-inch tape, yet accommodates half-inch tape.

SUMMARY OF THE INVENTION

The above object has been satisfied with a cartridge preserving ANSI standards for quarter-inch magnetic tape, yet accommodating half-inch magnetic tape by means of a new tape path. The new path involves routing tape around the inside periphery of the cartridge so that the tape encircles the drive belt in all places, except at the drive pulley. In this way, the magnetic tape completely avoids interference with both the drive belt and the drive pulley. The new tape path preserves most of the idlers presently used in the cartridge disclosed in U.S. Pat. No. 3,861,619 so that two new tape turning idlers can be positioned behind these. To preserve tape travel in the proper direction, tape is spooled from the inside surface of a tape roll to the inside surface of the other tape roll, as opposed to outside surface spooling which is presently done for quarter-inch tape. While this lengthens the tape path, the path is symmetrical such that tape tension is balanced, regardless of the direction of tape travel.

BEST MODE FOR CARRYING OUT THE INVENTION

Figure 1:
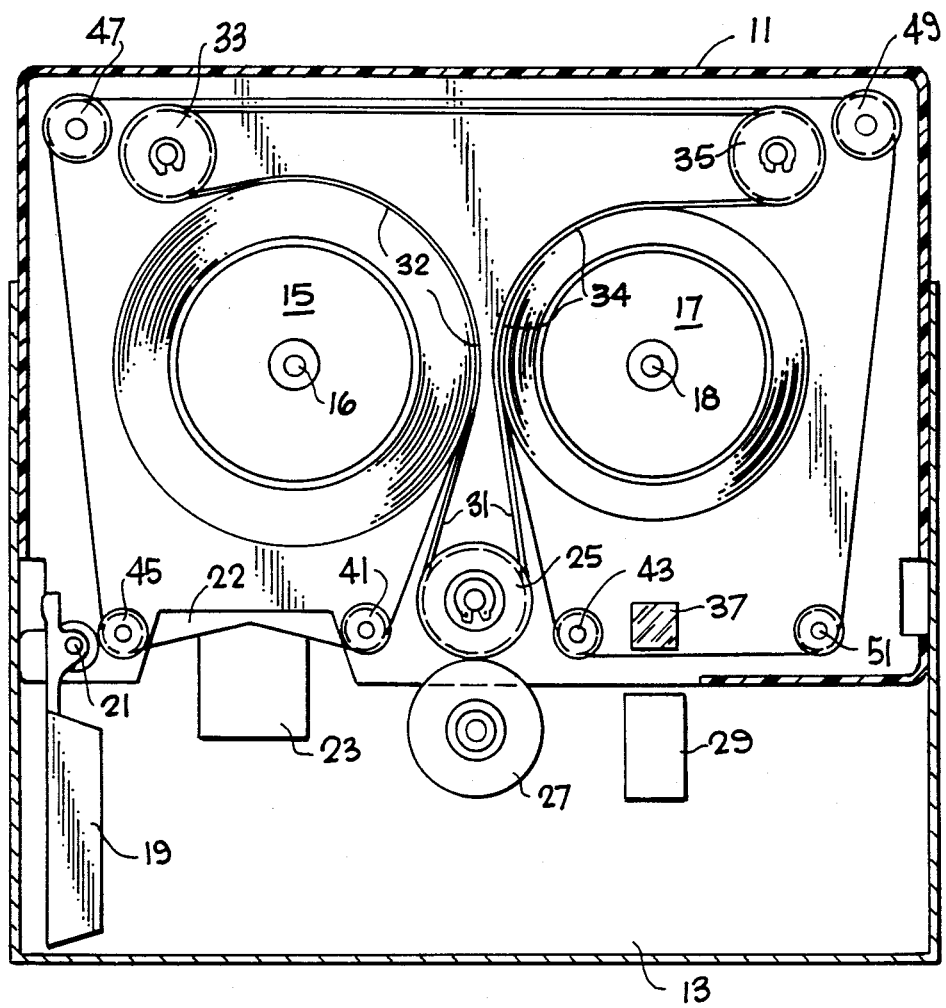
FIG. 1 is a top plan view of a tape cartridge of the present invention seated in a tape drive.

With reference to FIG. 1, a tape cartridge 11 may be seen seated within a drive support 13. Cartridge 11 has the outside dimensions of a quarter-inch ANSI-compatible cartridge including a height of 0.655 inches. The cartridge has two spaced-apart tape hubs 15 and 17, both mounted for rotation by means of respective axes 16 and 18. These axes may be pins which extend into upper and lower walls of the cartridge. The cartridge container includes an access door 19 which is hinged at a pivot 21. The door is shown in an open position, revealing the cutout opening 22 wherein magnetic head 23, associated with drive support 13, is located.

Also prescribed by the ANSI one-quarter inch cartridge standard is the location of drive pulley 25 which takes power from a capstan 27 associated with the drive. The position of capstan 25 must be such as to come into contact with capstan 27 when cartridge 11 is slid into drive support 13. The thickness of the drive pulley must be such that positive contact is made with the capstan so that a drive belt 31 can transfer power from the drive pulley to peripheral surfaces of the tape rolls. Drive belt 31 is trained around the drive pulley 25 and contacts inside surfaces 32 and 34 of both tape rolls and then is trained around the rearward drive belt idlers 33 and 35. These idlers are located slightly forward of the position shown in U.S. Pat. No. 3,861,619 so that tape turning idlers, discussed below, can be located behind these.

In accord with the ANSI standard for one-quarter inch cartridges, an end-of-tape optical sensor housing 29 is located approximately symmetrically opposite the tape head with respect to the drive pulley, which is in the center front of the cartridge. A cooperating optical member 37 is located in the cartridge, directly in front of the position of optical sensor 29 associated with the drive. Optical member 37 is typically a mirror which directs light from an overhead lamp toward the optical sensor 29 for the purpose of detecting holes in the tape, indicative of the beginning, end or load points of the tape.

The present invention requires six idlers for turning tape. Two of these idlers 41 and 43, termed first and second capstan idlers respectively, are immediately adjacent to the drive pulley 25. These idlers are termed "capstan" idlers because of their proximity to the expected position of capstan 27. These pulleys are on symmetrically opposite sides of drive belt pulley 25. A first turn idler 45 is located in the forward corner of the cartridge, just as in the prior art so that a tape span can be created between idlers 41 and 45 bringing tape into contact with head 23. Newly provided second and third turn idlers, 47 and 49 are located in opposed rear corners of the cartridge, behind belt idlers 33 and 35. A fourth turn idler 51 is located in a forward corner of the cartridge on a side opposite the head.

Tape is trained from supply hub 15 around the first capstan idler 41 and thence past head 23 to first turn idler 45. From there the tape is trained around second turn idler 47 and thence to third turn idler 49, parallel to the drive belt span between drive belt idlers 33 and 35. From there the tape is trained forwardly to fourth turn idler 51 and then to second capstan idler 43 and thence to the takeup hub 17. Assuming that tape roll 15 is the supply roll, tape is traveling from right to left past the head, in the same direction as if tape roll 15 were the supply roll and the tape path had the path indicated in the previously mentioned patent. In other words, the present geometry preserves the direction of tape movement past the head, compared to the path in the previously mentioned patent, for compatibility purposes, even though the path is completely different. In the present invention, the tape path follows the inside lateral walls and periphery of the cartridge in all areas except where the drive pulley 25 is situated, thereby avoiding interference with the drive belt. At the same time, the same power transfer scheme and the same drive belt path, known in the prior art, may be used.

Due to the half-inch width of the tape, upper and lower walls of the cartridge must be made relatively thin to preserve the overall thickness dimension of 0.655 inches.

In quarter-inch cartridges, the head 23 is able to move vertically, by means of a stepper motor to access a desired track. Using half-inch magnetic tape, the head will have to step slightly greater vertical distances in order to access all tracks on the tape. This will require a minor modification of some types of drives. Other types of drives can presently step heads greater distances in order to access all tracks.

The present half-inch cartridge is mechanically interchangeable with a quarter-inch cartridge, both cartridges being ANSI-compatible under the quarter-inch cartridge standard. The drive would sense the difference either by means of information on the tape or by means of a special sensor. Existing drives with wider heads could be used to sense all tracks on wider tape. In either case, the head would then be enabled, so that it could scan the number of tracks associated with half-inch tape. Existing drives for one-quarter inch ANSI-compatible cartridges could be used for driving the newly provided half-inch cartridges. While the invention has been explained with tape coming off hub 15 and wound on hub 17, it is obvious that the reverse will occur when tape is spooled in the opposite direction. In this specification, the term "idlers" is intended to encompass posts which are frequently substituted for idlers.

I claim:

1. A tape cartridge comprising, first and second spaced apart tape hubs for half-inch tape mounted in a quarter-inch, standard cartridge housing, the housing including a forward, centrally located drive pulley and two rearwardly opposite drive belt idlers, behind said tape hubs, having a drive belt trained around the drive pulley, contacting the inside surfaces of the tape hubs and trained around the drive belt idlers thereby transferring power from the drive pulley to the tape hubs, said housing having generally rectangular side walls, four tape turn idlers disposed proximate to corners of the housing and two more tape turn idlers spaced on opposite sides of the drive pulley, said tape turn idlers defining a substantially symmetrical tape path along which tape extends from the first tape hub on the side of the hub proximate to the second hub to a first tape idler proximate the drive pulley, thence around the tape cartridge following the inner peripheral wall of the cartridge trained about said four tape turn idlers proximate to corners of the housing, but avoiding crossing the drive pulley and back to a second tape idler proximate the drive pulley, thence to the second tape hub on the side of the hub proximate to the first hub.

2. A tape cartridge comprising, first and second spaced apart tape hubs mounted in a standard one-quarter inch tape cartridge housing, said spaced apart tape hubs having one-half inch tape mounted thereon, a drive pulley in the central forward portion of the cartridge with first and sixth tape turn idlers spaced on either side of said drive pulley and a capstan position in close proximity thereto, with tape coming off the first tape hub on the said side of the cartridge as the first capstan idler and a magnetic head, said tape trained around the first capstan idler and past the head, second and fifth tape turn idlers in opposed forward corners of the cartridge, third and fourth tape turn idlers in opposed rear corners of the cartridge, with tape coming past the head and around the second, third fourth and fifth tape turn idlers, thence toward said sixth idler and toward the second tape hub, the combination of said tape hubs and the turn idlers defining a substantially symmetrical tape path, and a drive belt trained around the drive pulley and a pair of driver belt idlers slightly forward of said third and fourth idlers in opposed rear corners of the cartridge, said drive belt contacting inward surfaces of said tape rolls.

3. An apparatus for mounting oversize tape in a tape cartridge comprising, a rectangular tape cartridge having a housing with standard specification dimensions, head placement, access door, two spaced apart tape hubs, an outwardly facing drive pulley for contacting a drive capstan and a drive belt trained around the drive pulley, contacting the inner periphery of both tape hubs and trained about opposed belt idlers near the rear corners of the cartridge housing, and oversize tape relative to said standard specification substantially symmetrically trained from the hub closest the head toward a first tape turn idler adjacent the drive pulley on the side of the cartridge toward the head, thence past the head toward the forward corner of the cartridge near the head and around a second tape turn idler, thence rearwardly toward the rear corner of the cartridge and to a third tape turn idler behind a belt idler, thence laterally toward the opposite rear corner of the cartridge and to a fourth tape turn idler behind another belt idler, thence forwardly to the other forward corner of the cartridge around a fifth tape turn idler, thence toward a sixt tape turn idler adjacent the drive pulley on the side opposite the head, thence toward the hub furthest from the head.

4. A tape cartridge comprising, a rectangular housing having standard cartridge dimensions, the housing having a front and a portion cut away from said front for receiving a tape head, a pair of tape hubs for tape, oversize in width relative to said standard dimensions, supported for rotation on parallel axes, a driver pulley supported on an axis located in the center of said front edge, two rearwardly opposite drive belt idlers located on parallel axes behind said tape hubs, an endless drive belt extending around the driver pulley and around the drive belt idlers, said drive belt contacting the surface of the tape hubs, thereby transferring power from the drive pulley to the tape hubs, and four tape turn idlers disposed proximate to corners of the housing and two more tape turn idlers spaced on opposite sides of and proximate to the drive pulley, said tape idlers defining a substantially symmetrical tape path along which tape extends from one tape hub on the side of the hub proximate to the second hub to the first tape idler proximate the drive pulley, thence around the tape cartridge following the inner peripheral wall, trained about said four tape turn idlers proximate to corners of the housing, but avoiding crossing the drive pulley, and back to the second tape idler proximate the drive pulley, thence to the second tape hub on the side of the hub proximate to the first hub.

* * * * *